United States Patent
Kloft et al.

(10) Patent No.: US 11,268,548 B2
(45) Date of Patent: Mar. 8, 2022

(54) TENSIONING CYLINDER DEVICE

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 93 days.

(21) Appl. No.: 16/316,704

(22) PCT Filed: Jun. 29, 2017

(86) PCT No.: PCT/EP2017/000775
§ 371 (c)(1),
(2) Date: Jan. 10, 2019

(87) PCT Pub. No.: WO2018/014996
PCT Pub. Date: Jan. 25, 2018

(65) Prior Publication Data
US 2019/0162209 A1   May 30, 2019

(30) Foreign Application Priority Data
Jul. 20, 2016 (DE) ..................... 10 2016 008 882.6

(51) Int. Cl.
*F16L 37/62* (2006.01)
*B23Q 3/08* (2006.01)
(Continued)

(52) U.S. Cl.
CPC ............ *F15B 15/1476* (2013.01); *B23Q 3/08* (2013.01); *B23Q 3/082* (2013.01); *F15B 1/103* (2013.01);
(Continued)

(58) Field of Classification Search
CPC ................. B23Q 3/082; F15B 2201/31; F15B 2201/3153; F15B 15/1476; F15B 15/02;
(Continued)

(56) References Cited

U.S. PATENT DOCUMENTS 2,533,413 A * 12/1950 Williams ................. B23Q 3/08
  269/34
4,395,027 A *  7/1983 Nordmeyer ......... F15B 11/0325
  269/25
(Continued)

FOREIGN PATENT DOCUMENTS

DE      33 12 049       10/1984
DE      103 10 930       9/2004
(Continued)

OTHER PUBLICATIONS

JP-02192829-A EspaceNet Translation (Year: 1990).*
(Continued)

*Primary Examiner* — Tyrone V Hall, Jr.
*Assistant Examiner* — Makena S Markman
(74) *Attorney, Agent, or Firm* — Wenderoth, Lind & Ponack, L.L.P.

(57) ABSTRACT

A tensioning cylinder device includes a housing (2), at least partly longitudinally movable piston-rod unit (30, 34) arranged in the housing and a compensating element in the form of a bellows body (18) having bellows folds. The bellows body is longitudinally variable and has a media-carrying connection to a compressible medium accommodated in a medium chamber (12) in the housing (2).

18 Claims, 2 Drawing Sheets

(51) Int. Cl.
 *F15B 1/10* (2006.01)
 *F15B 15/14* (2006.01)
(52) U.S. Cl.
 CPC .......... *F16L 37/62* (2013.01); *B23Q 2703/04* (2013.01); *F15B 2201/205* (2013.01); *F15B 2201/3153* (2013.01)
(58) Field of Classification Search
 CPC .............. F15B 15/1428; F15B 15/1452; F15B 15/1457; F15B 1/103
 USPC ............................................... 138/31; 269/24
 See application file for complete search history.

(56) References Cited

U.S. PATENT DOCUMENTS

| | | | | |
|---|---|---|---|---|
| 5,836,161 | A * | 11/1998 | Malina | F15B 3/00 60/560 |
| 6,345,707 | B1 * | 2/2002 | Klembczyk | F16F 9/003 188/298 |
| 6,378,848 | B1 * | 4/2002 | Uchida | B60M 1/26 267/64.25 |
| 6,378,856 | B1 * | 4/2002 | Takahashi | B25B 5/122 269/32 |
| 7,112,011 | B2 * | 9/2006 | McCarty | E21B 19/006 405/224.4 |
| 7,464,799 | B2 * | 12/2008 | Kojima | F15B 1/103 188/276 |
| 8,292,280 | B2 * | 10/2012 | Yokota | B23Q 3/06 269/254 R |
| 8,443,841 | B2 * | 5/2013 | Wellner | F15B 1/103 138/30 |
| 8,746,287 | B2 * | 6/2014 | Dorr | F15B 1/24 138/30 |
| 9,027,600 | B2 * | 5/2015 | Yamashita | F15B 1/103 138/31 |
| 9,816,538 | B1 * | 11/2017 | Wagner | E21B 17/01 |
| 10,473,123 | B2 * | 11/2019 | Hyodo | F15B 1/103 |
| 2003/0066564 | A1 * | 4/2003 | Arisato | B23Q 1/0018 137/614.06 |
| 2004/0250866 | A1 * | 12/2004 | Bartsch | F15B 1/22 138/30 |
| 2005/0121846 | A1 * | 6/2005 | Kawakami | B23B 31/402 269/309 |

FOREIGN PATENT DOCUMENTS

| | | | |
|---|---|---|---|
| DE | 10 2011 009 276 | | 7/2012 |
| DE | 10 2013 011 115 | | 1/2015 |
| EP | 0280649 | A1 * | 8/1988 .......... B25B 27/026 |
| JP | 2-192829 | | 7/1990 |
| JP | 02192829 | A * | 7/1990 |
| JP | 10-19001 | | 1/1998 |
| JP | 2001-248760 | | 9/2001 |

OTHER PUBLICATIONS

EP-0280649-A1 EspaceNet Translation (Year: 1988).*
International Search Report (ISR) dated Sep. 25, 2017 in International (PCT) Application No. PCT/EP2017/000775.

* cited by examiner

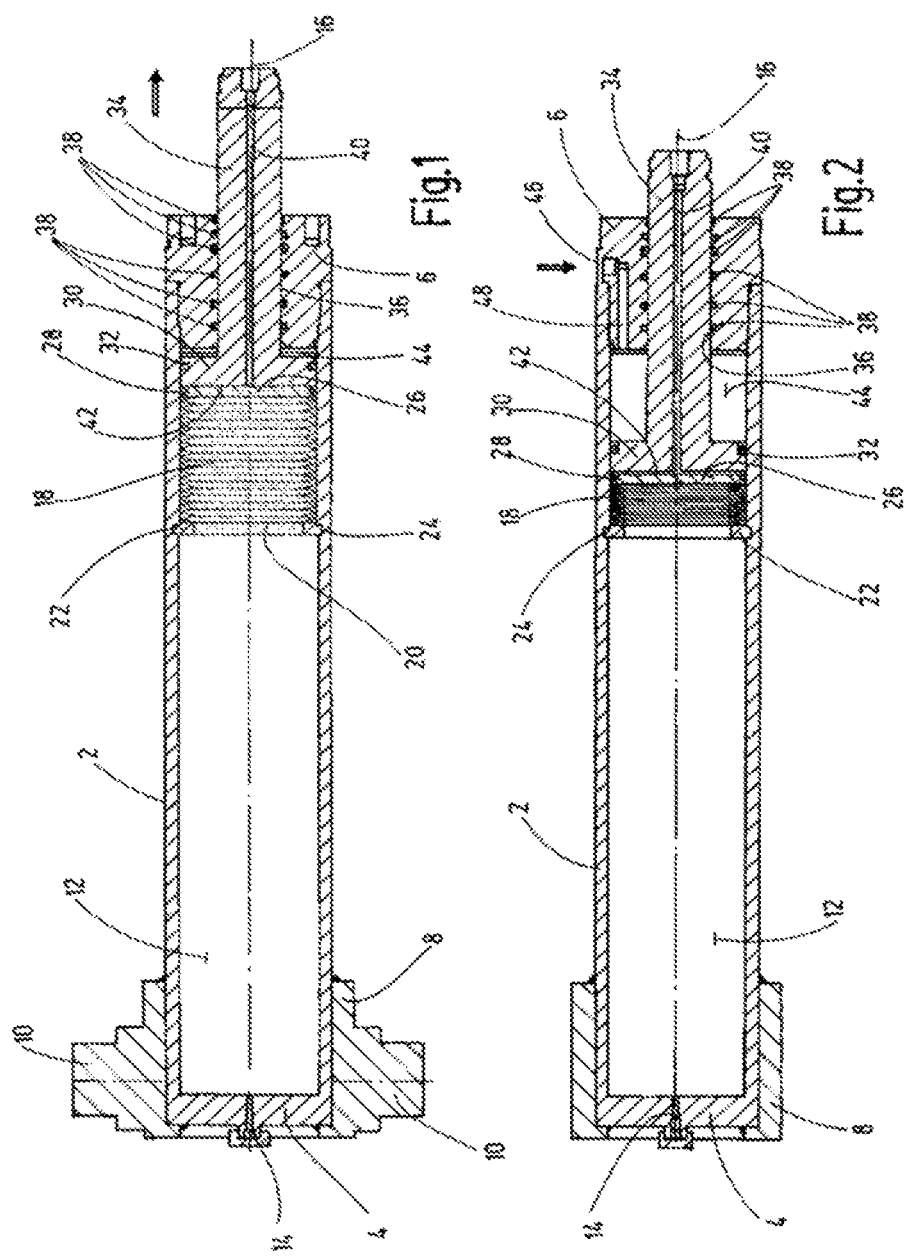

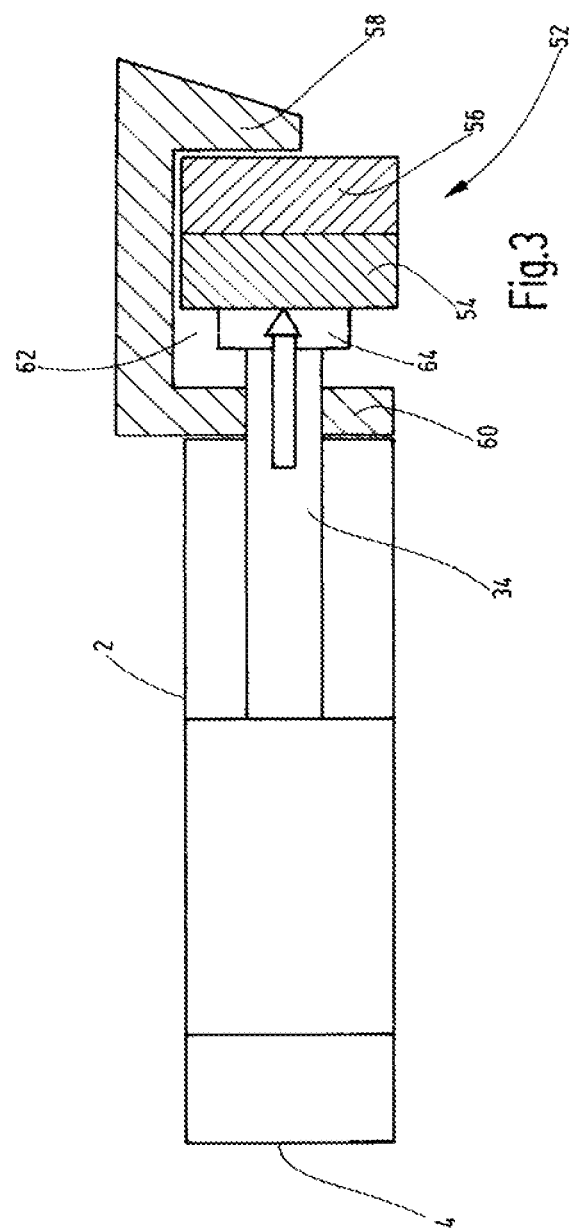

TENSIONING CYLINDER DEVICE

FIELD OF THE INVENTION

The invention relates to a tensioning cylinder device, comprising a housing and an at least partially longitudinally displaceable piston-rod unit arranged therein. Furthermore, the invention relates to a collet, in particular for attaching two flange halves to each other.

BACKGROUND OF THE INVENTION

Tensioning cylinder devices having a longitudinally movable piston-rod unit for generating an actuating force are state of the art. Such cylinder devices are often used as holding cylinders or as actuating cylinders, for example in power plants. In particular in applications as holding cylinders, it must be ensured that the generated tensioning force does not decrease over a long period of time. This requirement must be met especially in off-shore applications of tensioning cylinder devices. In this case, tensioning cylinder devices are used to keep flange halves together using a predetermined force, for example on underwater housings or pipelines or the like. Several tensioning cylinder devices are frequently arranged at the periphery of flanges in such systems.

For example, DE 10 2011 009 276 A1 has already proposed a device for transmitting a hydraulic working pressure in a pressure fluid for pressure actuation of hydraulic devices of deep-sea installations. A first pressure chamber for the pressure fluid, a movable piston arrangement for changing the volume of this pressure chamber and at least a second pressure chamber are present in a cylinder arrangement. The second pressure chamber can be pressurized with the ambient pressure of the deep sea to generate a movement of the piston assembly generating a working pressure in the first pressure chamber. In this known solution, the working pressure in the cylinder assembly is not generated or transmitted by seawater acting directly on the piston assembly. A pressure accumulator is located upstream of the cylinder assembly, from which pressure accumulator an actuating fluid, which is at the deep sea pressure, can be fed to the cylinder assembly, in order to generate the required working pressure.

SUMMARY OF THE INVENTION

Based on this prior art, the invention addresses the problem of providing a tensioning cylinder device, by which a permanent operating force can be safely generated over long periods of operation.

According to the invention this problem is solved basically by a tensioning cylinder device having a media chamber holding a compressible medium, such as a working gas, such as $N_2$, in the housing. The media chamber is in connection with a variable-length bellows body, with a compressed gas volume available as energy storage. As this compressed gas volume is enclosed by a variable-length bellows body, preferably in the form of a metal bellows, and thus is hermetically closed, reliability over long periods of time is ensured. The tensioning cylinder device according to the invention is therefore particularly suitable for underwater use. As the variable length bellows body can serve as a transmission element for the operating force on the piston-rod unit generated by the energy storage, the tensioning cylinder device according to the invention is also characterized by a simple, compact and reliable construction.

In advantageous exemplary embodiments the bellows body is clamped in the housing between an attachment point located there and a movable guide plate. The guide plate separates a second media chamber holding an incompressible medium from the media chamber holding the compressible medium. That guide plate may be welded to the adjacent last bellows fold as the end closure plate of the bellows body. A commercial metal bellows closed on at least one side can also be used.

Advantageously, the bellows body may be dimensioned such that the outside of its bellows folds is guided along the inside of the cylindrical housing. This guiding increases the stability against buckling.

With particular advantage, the arrangement can be made such that within the housing the piston-rod unit separates the second media chamber holding the incompressible medium from a further, third media chamber holding a likewise incompressible medium. In this way, a compact, tradable physical unit is created.

In this arrangement, the pressure existing in the first media chamber holding the compressible medium acts on the piston-rod unit via the guide plate of the bellows body and via the second media chamber holding the incompressible medium. The incompressible medium, which forms the intermediate transformer for actuating forces effective between the guide plate and piston rod unit in the second media chamber, may be a highly viscous oil. The viscosity of the oil forms a kind of damping pad between the guide plate and the adjacent end face of the piston-rod.

The further, third media chamber can be provided with a control port. When pressurized with a fluid pressure that is greater than the pressure of the compressible medium, the control port permits the retraction of the piston-rod unit in the direction of the guide plate.

The pressure supply by the control port can be designed such that an end-side piston surface is supported on a residual volume of incompressible medium in the third media chamber in the fully extended state of the piston-rod unit. In the fully extended state, a damping fluid cushion is then present also between this end face of the piston and the facing wall of the housing delimiting the third media chamber to aid in preventing the direct contact of metallic surfaces.

In advantageous embodiments, the rod of the piston-rod unit has an outwardly closable passage opening, which opens into the second media chamber and which serves to receive the incompressible medium. As mentioned above, this incompressible medium is preferably a highly viscous oil.

The housing may be cup-shaped, having a closing head having the control port. The rod of the piston-rod assembly may extend outwardly through a central bore in the closing head. Sealing members located within the drilled hole form the seal of the third media chamber located on the rod side of the piston.

The attachment point for the bellows body can be formed in an advantageous manner from a securing ring. The securing ring stationarily engages with a recess in the inner wall of the housing.

The invention is also a collet, in particular for attaching two flange halves to each other using a pre-determinable tensioning force, which is maintained over a long period of use, having two tensioning jaws. In particular, the tensioning jaws limit a tensioning space for receiving the two flange halves. One tensioning jaw can be moved towards and away from the other jaw. The collet is characterized in that at least one tensioning jaw can be moved by a tensioning cylinder device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view in section of a tensioning cylinder device according to an exemplary embodiment of the invention, wherein the tensioning state is shown, in a representation reduced by approximately a factor of 6½ in comparison to the size of a practical embodiment;

FIG. 2 is a side view in section of the exemplary embodiment of FIG. 1, rotated by 90° with respect to FIG. 1, wherein the release state is shown; and FIG. 3 is a mainly schematically drawn side view in section of a collect actutable by the tensioning cylinder device according to the invention.

DETAILED DESCRIPTION OF THE INVENTION

The exemplary embodiment of the tensioning cylinder device shown has a circular cylindrical housing 2, which is closed by a bottom 4 to form a cup at the end on the left in FIGS. 1 and 2. A screwed-in closing head 6 is provided as a housing closure at the opposite end of the housing 2. In the area of the bottom 4, the housing 2 is welded to a holding body 8 having fasteners 10 projecting on two opposite sides as an attachment for installation in a relevant system.

The part of the housing 2 adjacent to the bottom 4 serves as a first media chamber 12, which can be filled with a highly pressurized, for instance at 250 to 300 bar, working gas, such as $N_2$, via a filling port 14. Port 14 is arranged at the bottom 4 coaxially to the housing longitudinal axis 16. The end of the media chamber 12 opposite the bottom 4 is formed by a bellows body 18, which is formed as a metallic bellows. The outside of the bellows folds of bellows body 18 is guided longitudinally variably on the inner wall of the housing 2. The open end of the bellows body 18 facing the bottom 4 is attached to an attachment point of the housing 2. The attachment point is designed in the example shown by a securing ring 22, to which the last bellows fold of the bellows body 18 is welded, or only rests against. In the manner of a snap ring, bellows body 18 sits in a recessed indentation 24 in the inner wall of the housing 2. At the other end, the bellows body 18 is closed by a guide plate 26 welded to the adjacent last fold of the bellows, or even only resting against the latter. Guide plate 26 is longitudinally movable in the housing 2 and is guided on the housing inner wall by a guide 28.

As shown in FIGS. 1 and 2, the securing ring 22 is fixed to the inner wall of the housing 2 in a position, in which the length of the first media chamber 12 containing the pressurized gas is substantially larger than the remaining length of the housing 2 in the housing 2 from the attachment point on the securing ring 22 to the outer end of the closing head 6. In the example shown in FIGS. 1 and 2, the securing ring 22 is disposed at a position where the distance from the bottom 4 is about 1.6 times the distance from the outer end of the closing head 6. In the housing section between the guide plate 26 and the closing head 6, a piston-rod unit is arranged. The piston 30 of the piston-rod unit is longitudinally movable in the housing 2 and sealed by a piston seal 32. The rod 34 of the piston rod unit extends from side of the piston 30 facing the closing head 6 and extends through a through bore 36 formed in the closing head 6 coaxial to the cylinder axis 16 to the outside. Sealing elements 38 form the seal between the rod 34 and the closing head 6.

The rod 34 has a channel or passage 40 coaxial to the axis 16. Channel 40 extends from the flat piston side of the piston 30 facing the guide plate 26 and opening at the end of the flat piston side into the second media chamber 42 in fluid communication to the outer free end of the rod 34 opposite the second media chamber. The end of channel 40 at the outer free end of the rod 34 is closable by placing a suitable closure in the widened section of channel 40 adjacent the outer free end of rod 34. The channel 40 can be used to fill a highly viscous oil as an incompressible medium into a second media chamber 42, which is located between the flat piston side of the piston 30 and the guide plate 26. Once the second media chamber is filled, the end of channel 40 at the outer free end of the rod 34 is closed. The annular space surrounding the rod side of the piston 30 and extending to the facing end of the closing head 6 forms a third media chamber 44 for an incompressible medium. The incompressible medium, such as hydraulic oil, is supplied to this third media chamber 44 via a control port 46 (FIG. 2) of the closing head 6 and via a control channel 48, and forms the control medium for a release operation of the tensioning cylinder device.

FIG. 1 shows the tensioning state of the device, in which no effective control pressure exists in the third media chamber 44, which effective control pressure would counteract the gas pressure existing in the first media chamber 12. The pressure of the first media chamber 12 functioning as an energy storage has therefore extended the bellows body 18. The guide plate 26 acts upon the piston 30 with displacement force, such that the rod side of the piston 30 has moved against the closing head 6 and such that the rod 34 is extended into the tensioning position. In doing so, the viscous oil acts as a pad cushioning the metallic contact in the gap-shaped second media chamber 42 between the guide plate 26 and piston 30. A residual volume of hydraulic oil serving as a control medium in the third media chamber 44 again acts as a cushioning pad in the third media chamber 44 against direct mechanical contact between the rear side of the piston 30 and the closing head 6.

FIG. 2 shows the released state when the control pressure is supplied via the control port 46. For the smaller rod-side pressure-effective piston surface in the media chamber 44, the control pressure is supplied at a far higher pressure level in relation to the working gas pressure existing in the first media chamber 12, for instance at a release oil pressure of 700 bar, for a gas pressure of 250 up to 300 bar existing in the energy storage (media chamber 12).

The highly viscous oil introduced via the channel 40 in the media chamber 42 that establishes the power coupling between the bellows guide plate 26 and the bottom of the piston 30 may preferably be provided at a correspondingly larger amount to compensate for possible losses through the individual sealing system. Furthermore, the pressure at the pressure port 46 may be permanently monitored by a pressure sensor (not shown). Upon detection of a pressure increase in the media chamber 44 in the tensioning state of the device, i.e. in the absence of the control pressure in the media chamber 44, a leak at the piston 30 can be detected, such that a scheduled maintenance can be performed including the replacement of sealing elements. Such monitoring is not possible for the tensioning devices in the prior art that use spring force.

FIG. 3 shows a simplified schematic representation of a collet 52 for fixating flange halves 54 and 56, drawn in a schematized manner, between two tensioning jaws 58 and 60, which define a tensioning space 62 for receiving the flange halves 54, 56. In doing so, the piston rod 34 of the tensioning cylinder device according to the invention forms a movable part of the tensioning jaw 60 in the form of a pressure piece 64, which is movable upon actuation by the tensioning cylinder device having a tensioning stroke of 100 mm shown in the example in FIGS. 1 and 2. The flange halves 54, 56 shown are solely held to each other in the fixed state by the tensioning jaws 58 and 60 of the collets 52 via the gas pressure in the first media chamber 12. As the metal bellows 18 is designed to be media-tight and as the guide plate 26 sealed by the seal 28 is pressed against the high pressure oil volume of the media chamber 42 as shown in the pertinent FIG. 1, which oil volume also forms a kind of seal, gas losses are prevented and a long-lasting positive connection is achieved.

While one embodiment has been chosen to illustrate the invention, it will be understood by those skilled in the art that various changes and modifications can be made therein without departing from the scope of the invention as defined in the claims.

The invention claimed is:

1. A clamping cylinder device, comprising:
a housing having a longitudinal axis;
a piston-rod unit at least partially displaceable in said housing along said longitudinal axis;
a compensating element including a bellows body having bellows folds, said bellows body being variable in length along said longitudinal axis and being in fluid communication with a first media chamber being closed in said housing and containing a pressurized compressible medium;
an attachment point fixed on said housing;
a movable guide plate in said housing separating a second media chamber in said housing from said first media chamber, said second media chamber containing an incompressible medium, said bellows body being attached to said attachment point and being stretched between said attachment point and said movable guide plate; and
a third media chamber being in said housing and containing an incompressible medium, said piston-rod unit separating said second media chamber and said third media chamber so as to prevent fluid communication therebetween in said housing.

2. The clamping cylinder device according to claim 1 wherein
an outside of said bellows folds of said bellows body engages and is guided along the inside surface of said housing.

3. The clamping cylinder device according to claim 1 wherein
pressure in said first media chamber is transmitted to said piston-rod unit via said guide plate and via said incompressible medium in said second media chamber.

4. The clamping cylinder device according to claim 1 wherein
said third media chamber is connected in fluid communication with a control port in said housing and is supplied with pressurized fluid via said control port at a pressure greater than a pressure of said compressible medium in said first media chamber in a manner retracting said piston-rod unit in a direction of said guide plate.

5. The clamping cylinder device according to claim 1 wherein
said piston-rod unit comprises an end-side piston surface resting against a residual volume of said incompressible medium in said third media chamber in a fully extended position of said piston-rod unit in said housing.

6. The clamping cylinder device according to claim 1 wherein
said piston-rod unit comprises a passage, extending along a length of said piston-rod unit, opening outside of said housing and opening into said second media chamber in fluid communication, an end of said passage opposite said second media chamber being closable.

7. The clamping cylinder device according to claim 4 wherein
said housing is cup-shaped and has a closing head with said control port.

8. The clamping cylinder device according to claim 1 wherein
said attachment point comprises a securing ring stationarily engaged in a recess in an inner wall of said housing, an end of said bellows body being fixedly attached to said securing ring.

9. The clamping cylinder device according to claim 1 wherein
said piston-rod unit comprises a piston head having a piston surface, said second media chamber being defined between said movable guide plate and said piston surface.

10. A collet attaching two flange halves to each other for maintaining a pre-determinable clamping force on the flanges over a long use period, the collect comprising:
first and second clamping jaws limiting a clamping space for receiving the two flange halves, said first clamping jaw being movable toward to and away from said second clamping jaw; and
a clamping cylinder device being coupled to said first clamping jaw and moving said first clamping jaw relative to said second clamping jaw, said clamping cylinder device including
a housing having a longitudinal axis,
a piston-rod unit at least partially displaceable in said housing along said longitudinal axis,
a compensating element including a bellows body having bellows folds, said bellows body being variable in length along said longitudinal axis and being in fluid communication with a first media chamber being closed in said housing and containing a pressurized compressible medium,
an attachment point fixed on said housing,
a movable guide plate in said housing separating a second media chamber in said housing from said first media chamber, said second media chamber containing an incompressible medium, said bellows body being attached to said attachment point and being stretched between said attachment point and said movable guide plate, and
a third media chamber being in said housing and containing an incompressible medium, said piston-rod unit separating said second media chamber and said third media chamber so as to prevent fluid communication therebetween in said housing.

11. The collet according to claim 10 wherein an outside of said bellows folds of said bellows body engages and is guided along the inside surface of said housing.

12. The collet according to claim 10 wherein pressure in said first media chamber is transmitted to said piston-rod unit via said guide plate and via said incompressible medium in said second media chamber.

13. The collet according to claim 10 wherein said third media chamber is connected in fluid communication with a control port in said housing and is supplied with pressurized fluid via said control port at a pressure greater than a pressure of said compressible medium in said first media chamber in a manner retracting said piston-rod unit in a direction of said guide plate.

14. The collet according to claim 10 wherein said piston-rod unit comprises an end-side piston surface resting against a residual volume of said incompressible medium in said third media chamber in a fully extended position of said piston-rod unit in said housing.

15. The collet according to claim 10 wherein said piston-rod unit comprises a passage, extending along a length of said piston-rod unit, opening outside of said housing and opening into said second media chamber in fluid communication, an end of said passage opposite said second media chamber being closable.

16. The collet according to claim 10 wherein said housing is cup-shaped and has a closing head with said control port.

17. The collet according to claim 10 wherein said attachment point comprises a securing ring stationarily engaged in a recess in an inner wall of said housing, an end of said bellows body being fixedly attached to said securing ring.

18. The collet according to claim 10 wherein said piston-rod unit comprises a piston head having a piston surface, said second media chamber being defined between said movable guide plate and said piston surface.

\* \* \* \* \*